United States Patent [19]

Close

[11] Patent Number: 4,603,282
[45] Date of Patent: Jul. 29, 1986

[54] AMPLIFIER DISSIPATION DIVERTOR CIRCUIT

[75] Inventor: Ernest F. Close, Fort Wayne, Ind.

[73] Assignee: Magnavox Government and Industrial Electronics Company, Fort Wayne, Ind.

[21] Appl. No.: 602,222

[22] Filed: Apr. 19, 1984

[51] Int. Cl.$^4$ .................. H01J 29/70; H02H 7/20; H03F 21/00
[52] U.S. Cl. ..................... 315/403; 315/399; 330/298; 330/207 P
[58] Field of Search ............ 315/403, 389, 397, 408; 330/207, 298, 302; 315/399

[56] References Cited
U.S. PATENT DOCUMENTS 4,203,056 5/1980 Itoh ................................. 315/389

Primary Examiner—Theodore M. Blum
Assistant Examiner—Gregory C. Issing
Attorney, Agent, or Firm—Thomas A. Briody; William J. Streeter; Richard T. Seeger

[57] ABSTRACT

The output of a deflection operational amplifier is coupled through a dissipation circuit to a deflection yoke coil of a stroke written cathode ray tube for deflecting an electron beam on the tube screen. A feedback circuit is coupled between the coil and the inverting input of the amplifier to control the current through the coil. The dissipation circuit comprises a dissipative resistor, such as an incandescent lamp, and a shunt connected bypass capacitor. The dissipation circuit dissipates power during coil steady current conditions such as exist during slow movement or hold of the electron beam on the screen when voltage across the coil is low but coil current may be high. Thus the power otherwise dissipated in the amplifier output transistors is dissipated in the dissipation circuit. The bypass capacitor passes high frequency deflection signals to the coil during coil high instantaneous current conditions corresponding to fast movement or slewing of the electron beam on the tube screen.

9 Claims, 2 Drawing Figures ns and servo-motor drives.

It is therefore an object of this invention to provide a relatively inexpensive and compact deflection amplifier circuit.

Another object is to provide an error sensing feedback amplifier circuit for an inductive load wherein the amplifier output transistor power dissipation is minimized.

A further object is to provide in the amplifier circuits of the previous objects a capacitor shunted dissipative resistor coupled between the amplifier output and the circuit load.

The above mentioned and other features and objects of this invention and the manner of obtaining them will become more apparent and the invention itself will be best understood by reference to the following description of an embodiment of the invention taken in conjunction with the accompanying drawings.

DESCRIPTION OF THE PREFERRED EMBODIMENT

Figure 1:
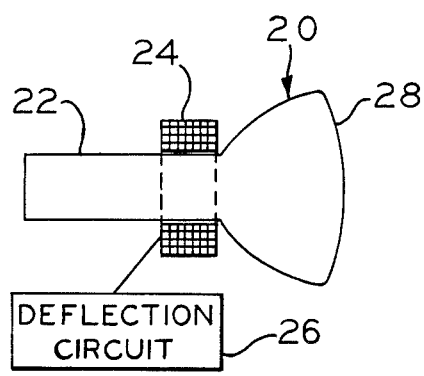
FIG. 1 is a partial block partially sectioned simplified diagram of a CRT and a deflection circuit.

Referring to FIG. 1 a simplified view of a stroke written CRT, a sectioned deflection yoke coil and a deflection circuit are shown. The usual concomitant CRT components and control circuits are not shown for the sake of explanation and simplification. The coil shown may be either the horizontal or vertical deflection coil, it being understood that each coil would be provided with a circuit of this invention. CRT 20 has neck 22 inserted through deflection yoke coil 24 in a manner well known in the art. Deflection circuit 26 provides a deflection signal to coil 24 to controllably deflect an electron beam to cause a display on screen 28 of CRT 20, also as well known in the art. In a stroke written CRT the deflection of the electron beam varies from fast movement across screen 28 to slow movement or beam hold at a particular point on screen 28 according to operator or program control of the beam movement. During a beam hold on screen 28 substantial unused power must be dissipated.

Figure 2:
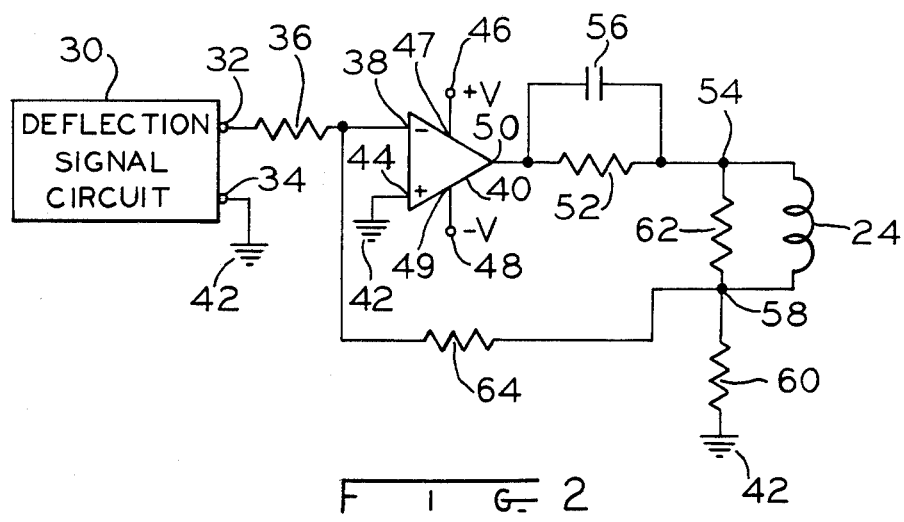
FIG. 2 is a partial block schematic diagram of the deflection circuit of FIG. 1.

Referring to FIG. 2 a partial block schematic diagram of circuit 26 is shown. Deflection signal circuit 30 provides a deflection signal which is amplified and drives coil 24. The deflection signal may be operator or program controlled and varies according to the desired movement of the electron beam on screen 28. Output terminal 32 of circuit 30 is coupled through resistor 36 to negative or inverting input 38 of operational amplifier 40. Output terminal 34 of circuit 30 is connected to ground 42. Positive or noninverting input 44 is connected to ground 42. Positive supply voltage +V at terminal 46 is coupled at pin 47 to amplifier 40 and negative supply voltage −V at terminal 48 is coupled at pin 49 to amplifier 40. As is understood in the art, amplifier 40 has output transistors, not shown individually but incorporated in the circuitry of and represented by amplifier 40, coupled between pins 47, 49. Output 50 of amplifier 40 is coupled through dissipative resistor 52 to terminal 54 of coil 24. Bypass nonpolarized capacitor 56 is shunted across resistor 52. Terminal 58 of coil 24 is coupled to ground 42 through current sensing resistor 60. Damping resistor 62 is coupled between terminals 54, 58. Feedback resistor 64 is coupled between terminal 58 and negative input 38. Operational amplifier 40 may be any of those known to the art and common to such amplifiers are output transistors, or equivalent output devices, incorporated in amplifier 40 as is well known in the art.

In the operation of circuit of FIG. 2 a deflection signal from circuit 30 is coupled through resistor 36 to negative input terminal 38 of amplifier 40 where it is amplified. Amplifier output 50 is coupled through resistor 52 and shunt connected capacitor 56 to terminal 54 of coil 24. Coil 24 deflects the electron beam in CRT 20 according to the amplitude and direction of current flowing through coil 24. For fast movement of the beam across screen 28 amplifier 40 output voltage is high and the current amplitude is correspondingly high. For slower movement of the beam the voltage amplitude across coil 24 is lower and for beam holding the voltage is a minimum. A current feedback path through resistor 64 causes current through coil 24 to correspond with the waveform of the input signal to amplifier 40 as is known in the art. When the current through coil 24 is high and the voltage across coil 24 is low, as it is for slow beam movement and beam hold, high power dissipation is required since the voltage from the supply applied to terminals 46, 48 is substantially constant and must be high enough to provide fast beam movement. In previous circuits this power dissipation occurs across the amplifier output transistors requiring relatively large and expensive transistors and also requiring relatively large and bulky heat sinks to prevent damage to the heat sensitive output transistors. In the circuit of this invention as shown in FIG. 2 the power at high current flow through coil 24 and low voltage across coil 24 is largely dissipated through resistor 52 resulting in lower power dissipation through the output transistors and cooler transistor operating temperatures. Thus smaller amplifier output transistors are required and heat sink requirements are alleviated resulting in less expensive and smaller circuit size.

The following example is illustrative of benefits of this invention. A supply voltage of +36 V is applied to terminal 46 and a supply voltage of −36 V is applied to terminal 48; yoke coil 24 has an inductance of 27 $\mu$H and a 0.5 ohm resistance; current sensing resistor 60 is 0.2 ohm; and resistor 52 is 5.7 ohms. During fast slewing from center of screen 28 to one edge, amplifier 40 places the entire 36 volts (+ or − depending on the direction of slew) across yoke coil 24 in a fraction of a microsecond to provide the large current needed to move the beam quickly across the screen 28. Since yoke coil 24 is inductive, the current flow through coil 24 takes some time, 10 microseconds or so, to rise to the value, 5.0 amps in this example, required to bring the beam to the edge of screen 28. Once the beam is at the edge, however, only 2.5 V (5.0 amps × 0.5 ohm) across coil 24 are required to keep the beam at the edge and thus only 12.5 watts are dissipated in coil 24. An additional 5.0 watts are dissipated in resistor 60. The total voltage drop across coil 24 and resistor 60 is only 3.5 V. The remainder of the 36 V, or 32.5 V, is in conventional circuits entirely across the output transistors resulting in a power dissipation in the transistors of 162.5 watts. With this invention the output transistors need dissipate only 20 watts while the remaining 142.5 watts are dissipated in resistor 52. This is an 88% power dissipation reduction in the output transistors.

Resistor 52 by itself, while providing the desired power dissipation, would adversely affect the high frequency performance as well as the slewing ability of the deflection circuit 26. By placing capacitor 56 in shunt with resistor 52 this performance deficiency is overcome since capacitor 56 passes the high frequency components of the deflection signal while the lower frequency and DC components of the signal are passed or dissipated largely in resistor 52. It has been found that the addition of resistor 52 and capacitor 56 in the deflection circuit produces no observable degrading affect on the deflection circuit operation if the values for resistor 52 and capacitor 56 are properly chosen. There is a maximum value for resistor 52 above which amplifier 40 cannot cause full screen deflection. Also there is a minimum capacitance value for capacitor 56 below which slewing and high speed writing are adversely affected. If resistor 52 is below the maximum value, proportionately less power dissipation benefit is obtained. Similarly if the capacitance of capacitor 56 is above the minimum value the amplifier output transistors will dissipate more power just after fast beam movement. Benefits of this invention are realized as long as the above mentioned maximum resistance value and minimum capacitance value are observed. Preferably the RC time constant of resistor 52 and capacitor 56 should be several times the full screen diameter fast beam slew time.

Dissipative resistor 52 may take many forms. An incandescent quartz halogen lamp available from General Electric Company, type 1986, has been used successfully and has the advantage of small size, low inductance and high power dissipation, in the order of 250 watts. Such a lamp has a "hot" resistance which may be six or seven times its "cold" resistance but, since at lower currents the dissipation problem is not as acute, the amplifier output transistors are still adequately protected using a lamp of this type. Thus using a lamp for resistor 52 is advantageous since its higher "hot" resistance offers higher protection at overload current conditions. Also such a lamp has a nonlinear resistance vs. current curve. Use of such a lamp for resistor 52 showed a 20° F. lowering of the amplifier output transistor temperature. A higher resistance lamp will provide an even lower amplifier output transistor temperature. Any resistor of suitable resistance and power rating may be used, however.

Capacitor 56 is selected to have low inductance and low equivalent series resistance; be able to withstand repeated current peaks as the beam is slewed rapidly; be capable of AC operation, i.e. not polarized like an electrolytic capacitor; and have a voltage rating great enough to withstand the peak output voltage swing of amplifier 40. A capacitance in the order of a few microfarads in typical circuits achieves the benefits of this invention.

Another advantage of this invention is protection of amplifier 40 against short circuit of its load. A shorted yoke circuit can severely damage a deflection amplifier but this invention offers a large measure of protection. Further, resistor 52 can be designed to act as a fuse if desired.

The amplifier circuit of this invention also may be used to advantage in other circuits. A circuit having an inductive load where the load voltage becomes small so that the amplifier circuit is required to dissipate large power quantities at high current may be benefited by this invention. Such amplifier circuits include dynamic focus and astigmatism coil drivers and servomotor drives.

While there have been described above the principles of this invention in connection with specific embodiments, it is to be understood that this is by way of example and is not limiting of the scope of this invention.

What is claimed is:

1. Amplifier dissipation divertor circuit comprising:
   amplifier means comprising a power output device, and input and an output for amplifying and input signal applied to said input;
   dissipation means for power dissipation and signal transmission;
   inductive load means coupled to said amplifier means output through said dissipation means for receiving said amplifier means output signal;
   said dissipation means comprising capacitor means for transmitting relatively high frequency signals to said load means during which said load means has a relatively high current flow therethrough and high voltage drop there across and dissipator means coupled in shunt with said capacitor means for dissipating direct current and relatively low frequency power during which said load means has a relatively high current flow therethrough and a relatively low voltage drop there across thereby reducing power dissipation in said amplifier means power output device and reducing heating of said amplifier means power output device during said load means relatively high current flow therethrough and relatively low voltage drop there across condition.

2. The apparatus of claim 1 including feedback circuit means coupled between said load means and said amplifier means input for controlling current through said load means in a manner corresponding to the waveform of said input signal.

3. The apparatus of claim 2 wherein said power output device is at least one transistor.

4. The apparatus of claim 2 including a deflection signal circuit having an output coupled to said amplifier means input; said load means comprises a deflection yoke coil in a stroke written cathode ray tube.

5. The apparatus of claim 2 wherein said load means has a first resistance and said dissipator means has a second resistance substantially higher than said first resistance.

6. The apparatus of claim 5 wherein said dissipator means comprises a power dissipator and said capacitor means comprises capacitor coupled in shunt with said dissipator; said power dissipator having said second resistance and said capacitor passing relatively high frequency signals.

7. The apparatus of claim 2 wherein said power dissipator means comprises and incandescent lamp.

8. The apparatus of claim 7 wherein said incandescent lamp comprises a quartz halogen lamp.

9. The apparatus of claim 2 wherein said dissipator means comprises a resistor.

* * * * *